June 20, 1961 F. S. LAPEYRE ET AL 2,988,771
PRESSURE DEVICES FOR PEELING SHRIMP
Original Filed Jan. 23, 1957 2 Sheets-Sheet 1
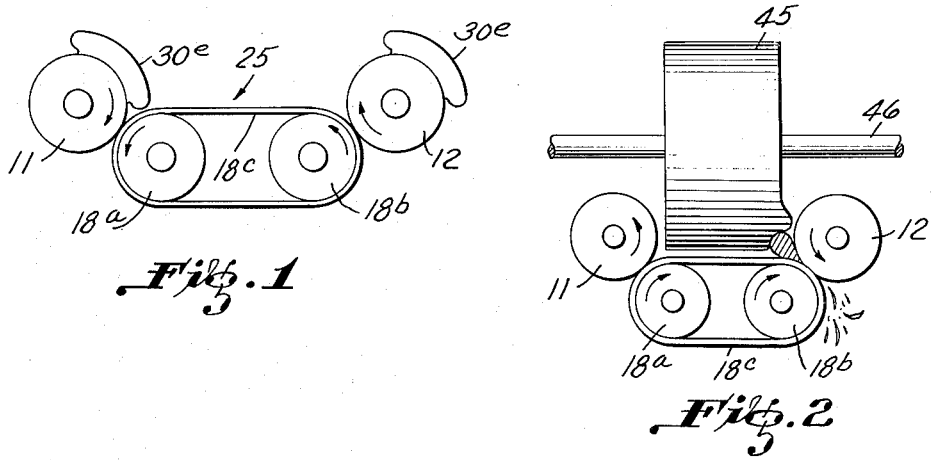
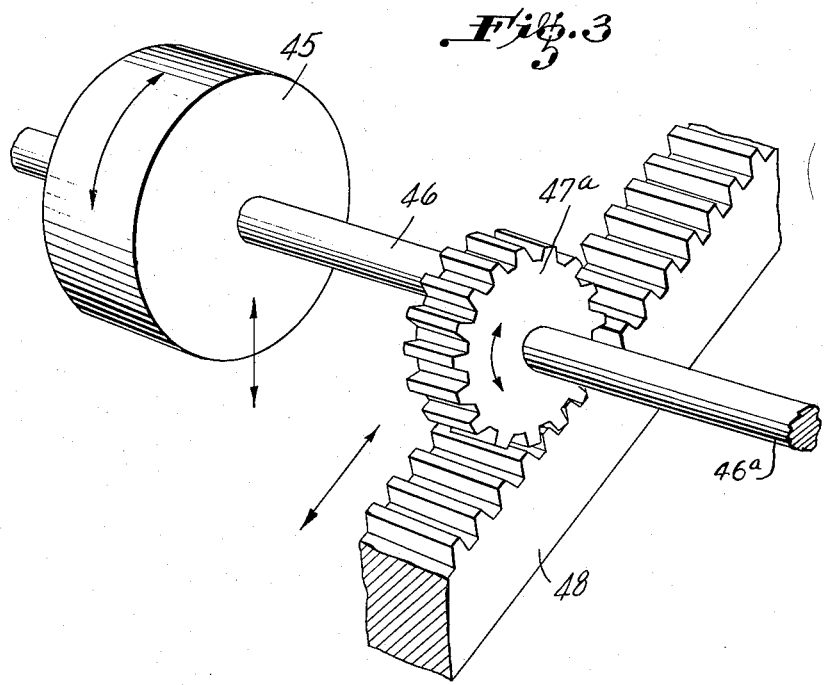
INVENTORS
F. S. LAPEYRE
J. M. LAPEYRE &
L. E. DEMAREST
BY
ATTORNEYS

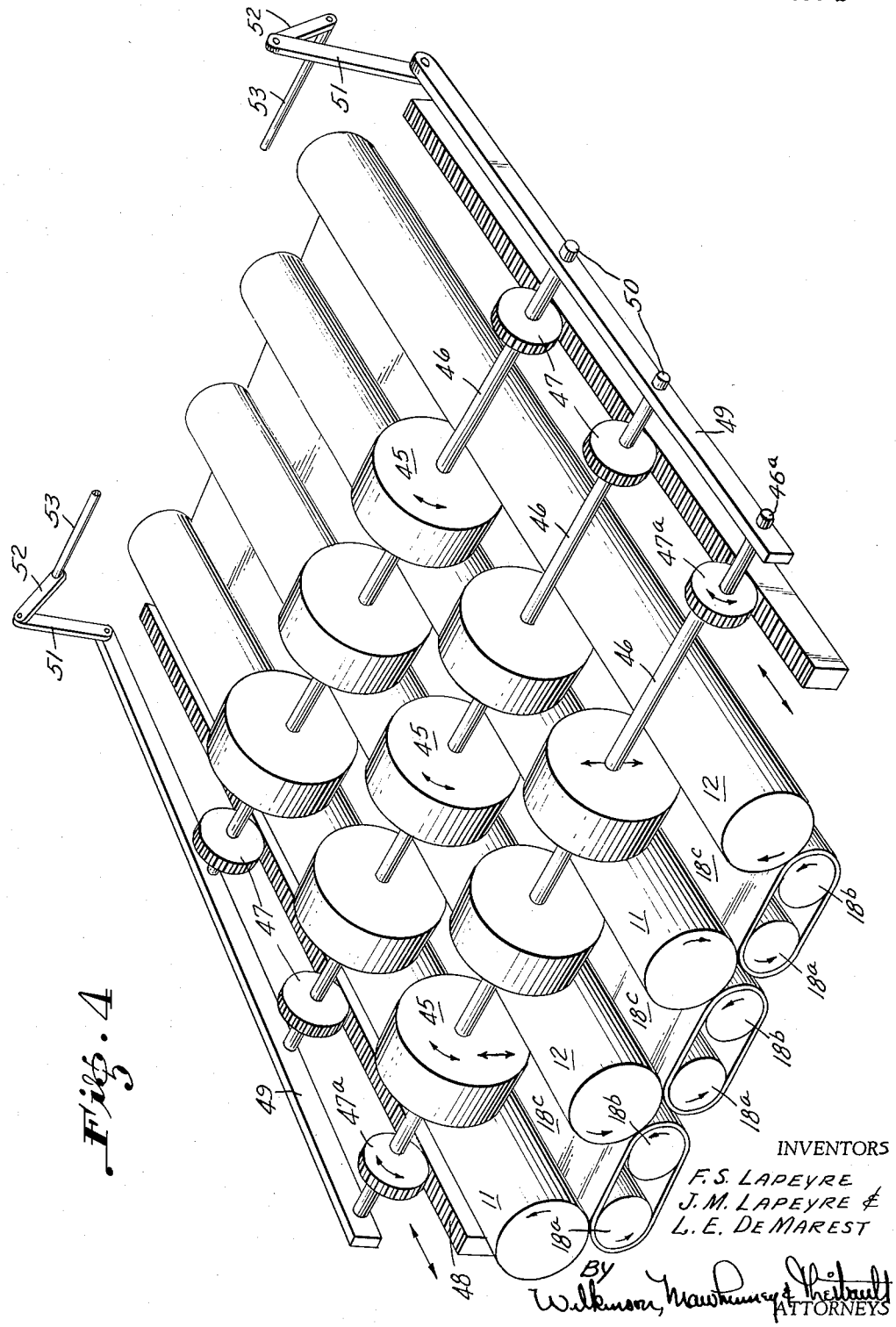

United States Patent Office 2,988,771
Patented June 20, 1961

2,988,771
PRESSURE DEVICES FOR PEELING SHRIMP
Fernand S. Lapeyre, James M. Lapeyre, and Leroy E. Demarest, New Orleans, La., assignors to The Peelers Company, Houma, La., a partnership
Original application Jan. 23, 1957, Ser. No. 635,785, now Patent No. 2,886,844, dated May 19, 1959. Divided and this application Oct. 14, 1957, Ser. No. 694,467
16 Claims. (Cl. 17—2)

This application is a division of our prior copending similarly entitled application Serial No. 635,785 filed January 23, 1957, now Patent No. 2,886,844.

The present invention relates to pressure devices for peeling shrimp and more particularly refers to a device for applying pressure to shrimp or the like in peeling crotches of shrimp peeling machines to obtain a more efficient peeling of the shrimp.

Among other applications the invention will be found useful in connection with the shrimp peeling rollers disclosed in U.S. Patent 2,574,044 granted November 6, 1951, and as a substitute for the pressure fingers 77 and 78 disclosed in U.S. Patent 2,537,355 granted January 9, 1951, the invention being also applicable to shrimp peeling machines such as disclosed in U.S. Patent 2,637,065 granted May 5, 1953, and in pending applications entitled Shrimp Peeling Machine, Serial No. 436,788, filed June 15, 1954, now Patent No. 2,840,850.

It is an object of the invention, in one aspect thereof, to provide partial or full rotary members or bodies which constitute the pressure devices which may swing toward and from the nips or peeling crotches for alternately applying pressure to shrimp in a direction toward the peeling crotches, and subsequently to swing away from the crotches to expose the same for the ejection of the peeled meat and to receive future supplies of the raw shrimp for peeling.

In the aspect of the invention referred to in the immediately preceding paragraph, it is another object of the invention to provide oscillating pressure devices mounted to move with the peeling rollers and to derive their motion from the rollers and from the source of power for operating such rollers so that it is not necessary to supply any additional source of power to energize the pressure devices.

In another aspect of the invention, it is an object thereof to provide rotary pressure devices mounted to roll lengthwise of the peeling crotches to ride upon the raw shrimp which have moved into peeling relation to such crotches; together with a mechanism for operating such rolling pressure devices, and as an addition thereto, if desired, to superimpose upon such rolling pressure devices a compound movement which consists in reciprocating the rolling devices toward and from the crotches.

It is a further object of the invention to achieve the foregoing results by a simple form of mechanism which will operate reliably and economically and which will entail no damage to the shrimp.

It is a still further object of the invention to supply pressure means to peeling channels having as a base a belt or flat platform.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is an end elevational view of a combined belt and roller form of peeling machine equipped with pressure devices according to the invention.

FIGURE 2 is a similar view illustrating a roller form of pressure device.

FIGURE 3 is a fragmentary isometric view of a roller device according to FIGURE 2 modified to disclose an eccentric motion for imposing upon the pressure rolls a reciprocating motion toward and from the channels and peeling crotches or nips.

FIGURE 4 is an isometric view of the roller form of pressure devices with means for rolling the same up and down the peeling channels.

In FIGURES 7 and 8 of said Patent 2,574,044, upper rollers 11 and 12 are shown as associated with a lower roller 18 to provide a peeling channel 25 along which the shrimp are propelled by gravity and/or a liquid stream, and 27 and 29 designate peeling crotches, nips or bights.

FIGURE 1 herein shows a slightly different form of device in which the lower roller 18 of the patent is replaced by two lower rollers 18ª and 18ᵇ which may be spaced apart any suitable distance and receive thereover the endless belt 18ᶜ. The action here is precisely the same as with a single lower roller 18. In other words the rollers 18ª and 18ᵇ are driven and provide peeling crotches with the rollers 11 and 12 in the same manner as the single roller 18 functions in said Patent 2,574,044, the belt 18ᶜ being merely used as an ordinary conveyor belt to move the shrimp in the channel 25 back and forth to opposite sides of the channel and into the peeling crotches afforded by the rollers 11, 18ª and 12, 18ᵇ. The rollers 18ª and 18ᵇ are oscillated back and forth by any suitable means, for instance that illustrated in said Patent 2,574,044. According to that patent the lower rollers 18 etc. are driven in an oscillating movement back and forth and they communicate like although relatively opposite movements to the upper rollers 11, 12 etc.

Accordingly in FIGURE 1 herein the oscillation of the lower rollers 18ª and 18ᵇ will frictionally through the belt 18ᶜ drive the upper rollers in oscillating movements which are relatively reversed as indicated by the arrows.

The upper rollers carry pressure bodies 30ᵉ, which in their entireties or in their tip portions are pliable, flexible or elastic, preferably resilient rubber. The pressure bodies 30ᵉ may be directly attached to the rollers 11, 12. This attachment may be by adhesive or otherwise.

In the use of this form of the device, as the rollers 11 and 12 carrying the pressure bodies 30ᵉ are oscillated back and forth they carry such pressure bodies with them into a similar oscillating movement. In one position of the rollers 11, 12, shown in FIGURE 1, one tip of pressure body of roller 11 is at the peeling crotch between rollers 11, 18ª. Such tips are deformable so as to exert elastic pressure of the tip against the shrimp on the belt 18ᶜ in addition to the pressure which is exerted by the roller drive mechanism tending to rotate the pressure bodies against the shrimp in the nips.

The shrimp or the like are thus kneaded into the peeling crotches by the pressure bodies. As the reciprocating or oscillating stroke changes the upper run or platform of the belt 18ᶜ will move toward the roller 12 carrying the shrimp toward the crotch between rollers 12, 18ᵇ at the same time bringing pressure body 30ᵉ of roller 12 down upon the shrimp on the belt at or approaching the latter crotch and a similar kneading action will take place at the right side of the channel 25 as viewed in FIGURE 1. At the commencement of this stroke change the pressure body 30ᵉ of roller 11 will lift and move counterclockwise releasing shrimp at the left crotch of the channel so that it may be carried by the belt to the right side.

As shown in FIGURE 1, the tips of the pressure bodies may be contoured to "cup" over the shrimp in the peeling position in which pattern they afford pressure toward the peeling crotch and provide the "kneading" action referred to which helps to loosen the shells.

The oscillating movement may be timed to prevent pinch of the tips of the pressure bodies in the crotches of the rollers. The pressure body "gives" to prevent damage to the meats. The tips of the pressure bodies may flatten out when they engage the belt 18ᶜ or a shrimp thereon to exert peeling pressure.

It will be clear from FIGURE 1 that the pressure bodies 30ᵉ are relatively angularly displaced on their respective rollers 11 and 12 for alternating action in approaching their respective peeling crotches incident to the reversal of the strokes of the oscillating movement.

It will be understood that FIGURE 1 illustrates a complete machine or a unit which may be repeated one or many times to form a complete machine in the manner indicated in the said Patent 2,574,044.

Referring more particularly to that form of the invention shown in FIGURES 2–4 inclusive, 45 designates the pressure bodies which in this instance are in the form of rolls of pliable, flexible or preferably resilient material, such bodies being mounted upon shafts 46 which are crosswise of the peeling channels and peeling crotches and carry fixed pinions 47 for engaging racks 48. The racks are immovable while the pinions roll along such racks and move therewith the shafts 46 and the rolls 45. In order to achieve this motion reciprocating side bars 49 may be attached to the shafts by bearings 50. The side bars 49 may be moved back and forth by any suitable mechanism for instance by the pitman 51 pivoted to the side bars 49 and to cranks 52 on a rotary or rock power shaft 53. Or the parts 53 may simply designate arms, that is drive arms which may be driven by separate power, for instance electric motor with a gear reducer, or the power may be derived from a unit which drives the peeling rollers.

FIGURE 2 shows the action in which a roll 45 contacting a shrimp in the peeling crotch is able to undergo a deformation by virtue of its inherent elasticity to exert upon the shrimp that elastic pressure and also a pressure occasioned by the weight of the rolls 45 and entrained parts. By this means adequate pressure may be applied to the shrimp without in any way damaging the meat or downgrading the same commercially.

Referring more particularly to FIGURE 3, it will appear that the shafts 46 are passed through the pinions 47ᵃ off-center, the shaft extensions 46ᵃ being concentric with the pinions 47ᵃ. This eccentric arrangement causes the shaft 46 and the rolls 45 to partake of a compound which involves rotation and also a reciprocating movement of the rolls 45 up and down with respect to the channels and peeling crotches. This is desirable in order to enable the shrimp to move from side to side in the channels, that is from one peeling crotch to the peeling crotch on the other side of the channel incident to reverse rotation of the rollers and it also enables the crotches to be freed from the pressure rollers or bodies 45 at stated intervals to allow fresh raw shrimp to get beneath these pressure bodies in readiness to be subjected to pressure when the pressure bodies or rolls 45 are subsequently lowered in the channels.

FIGURE 2 shows the application of the rolls 45 to a belt type peeling machine such as shown in FIGURE 1 and described more particularly in connection with that figure. The peeling and pressure action is the same whether the belt 18ᶜ is used or the single bottom roller 18 as in said Patent 2,574,044.

The bodies 45 roll up and down the channels and the bodies 30ᵉ of FIGURE 1 also roll back and forth with the rollers 11 and 12 so that in the claims both types of devices or rather all types of devices are designated as having a rolling action.

The pressure devices, whether in the form 30ᵉ shown in FIGURE 1 or the form 45 illustrated in FIGURES 2, 3 and 4, are so operatively associated with the platform or upper run of the belt 18ᶜ that such pressure means form barriers to the movement of the shrimp down the channels and such pressure means control the movement of the shrimp down the channels at least to some extent and such pressure means are also effective for changing the position of the shrimp on the various platforms.

The pressure devices also press the shrimp against the moving platform when in the one position and alternately withdraw the pressure and free the shrimp to move down the channel and to assume new positions on the platforms when the pressure devices are moved away from the platform or along the platform to a new position. When in the pressure positions the pressure devices do not move in the same sense that the belts or platforms move but the pressure devices exert pressure against the upper sides of the shrimp and immobilize such upper portions of the shrimp while the platform or belt below is moving so that the shrimp is being held stationary at one part and a moving surface pressure is exerted against the shrimp at an opposed part for loosening the shell and breaking the attachment of the shell to the body meat.

The pressure devices move angularly to the direction of movement of the belts 18ᶜ. In some cases, the pressure devices move up and down with respect to the plane of the top belt run and in the case of FIGURES 3 and 4 the pressure devices roll along the belts but across the same that is angularly to the direction of movement of the belts.

Invention also involves the process of peeling shrimp and the like which consists in immobilizing the shrimp on one side while subjecting the opposite side to movement in a substantially flat plane, which latter step is accomplished by the movement of the upper surface or platform of the belt in a back and forth movement. The immobilizing step is achieved by the pressure device coming down upon the upper portion of the shrimp and acting with the platform pressurizes the shrimp while it is being subjected to an immovable surface on its upper side and a movable substantially flat surface on its other side.

Although I have disclosed herein the best form of the invention known to me at this time, I reserve the right to all such modifications and changes as may come within the scope of the following claims.

What is claimed is:

1. For use in a machine for peeling shrimp and the like, a pair of peeling members movable relatively to one another and associated together to form a peeling crotch therebetween, one at least of the members being a roller, and a rolling pressure body positioned relatively to the peeling crotch to apply pressure to a shrimp in such crotch.

2. For use in a machine for peeling shrimp and the like, a pair of peeling members movable relatively to one another and associated together to form a peeling crotch therebetween, one at least of the members being a roller, a pressure roll, and means for moving the pressure roll longitudinally of the crotch in position to roll over and apply pressure to the shrimp in the crotch.

3. For use with a shrimp peeling machine comprising at least four rollers, an endless conveyor belt trained about two of the rollers, said rollers being associated together to form a peeling channel having peeling crotches at opposite sides of the same, and rolling pressure bodies fitted to move against the shrimp in the crotches and to apply pressure thereto.

4. For use with a shrimp peeling machine comprising at least two rollers and an endless conveyor belt associated together to form a peeling channel therebetween with peeling crotches at opposite sides of said channel, and rolling pressure bodies fitted to said channel and movable back and forth toward and from the crotches, said bodies being deformable to yield when encountering shrimp in the crotches.

5. For use with a shrimp peeling machine comprising a pair of peeling members associated together to form a peeling crotch, a substantially flat platform movable toward and from the crotch for supporting shrimp, and pressure means positioned relatively to the platform for pressing the shrimp thereagainst.

6. The machine of claim 5 in which the platform is a belt movable through the crotch.

7. The machine of claim 5 further comprising means connected to the pressure means for moving the pressure means toward and from the platform to alternately free the shrimp and press the shrimp against the platform.

8. The machine of claim 5 further comprising means connected to the pressure means for moving the pressure means back and forth along the platform to press shrimp at one area aginst the platform and free shrimp at the area vacated.

9. For use with a machine for peeling shrimp comprising at least two peeling members associated to form a peeling crotch, a substantially flat platform near the crotch, and means for applying pressure to shrimp during peeling in the crotch while supported on the substantially flat platform.

10. For use in a machine for peeling shrimp and the like, a pair of peeling members movable relatively to one another and associated together to form a peeling crotch therebetween, one at least of the members being a roller, the other member being a belt, and alternating pressure means movable toward and away from the crotch where shrimp are being peeled.

11. A shrimp peeling machine comprising a substantially flat platform, means connected to move the platform, and pressure means positioned relatively to the platform and movable with respect to the platform for alternately pressing shrimp against the moving platform and freeing such shrimp from the pressure.

12. A shrimp peeling machine comprising a substantially flat platform, means connected to move the platform, pressure means positioned relatively to the platform to engage shrimp thereon and movable back and forth relatively to the direction of movement of the platform, and actuating means connected to move the pressure means to press shrimp against the platform and alternately free such shrimp from the pressure.

13. A shrimp peeling machine as claimed in claim 12 further comprising means connected to the actuating means for causing the back and forth movement of the pressure means to take place toward and from the platform.

14. A shrimp peeling machine as claimed in claim 12 further comprising reciprocating means connected to the actuating means for causing the back and forth movement of the pressure means to take place in a direction along the platform.

15. For use with a shrimp peeling machine comprising a pair of peeling members associated together to form a peeling crotch, and a substantially flat platform movable toward and from the crotch for supporting shrimp, means independent of the platform and positioned relatively to the platform for changing the position of shrimp thereon.

16. For use with a shrimp peeling machine comprising at least one pair of peeling members associated together to form a peeling crotch, and a substantially flat platform movable toward and from the crotch for supporting shrimp, movable means independent of the platform and positioned relatively thereto to block and control the passage of shrimp along the platform, and drive means coupled to the movable means for alternately moving the same to blocking and clearing positions.

References Cited in the file of this patent

UNITED STATES PATENTS

| | | |
|---|---|---|
| 2,712,152 | Samanie | July 5, 1955 |
| 2,781,544 | Skrmetta | Feb. 19, 1957 |
| 2,784,450 | Jonsson | Mar. 12, 1957 |